Feb. 16, 1960 — C. W. NOYES — 2,925,592
MULTIPLE UNIT INDICATOR WITH INDIVIDUAL TESTING SYSTEM
Filed Dec. 9, 1958
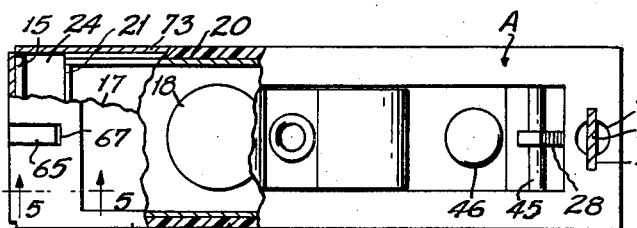
Fig. 3
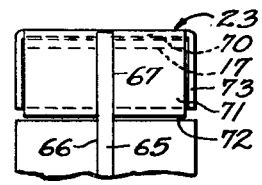
Fig. 6
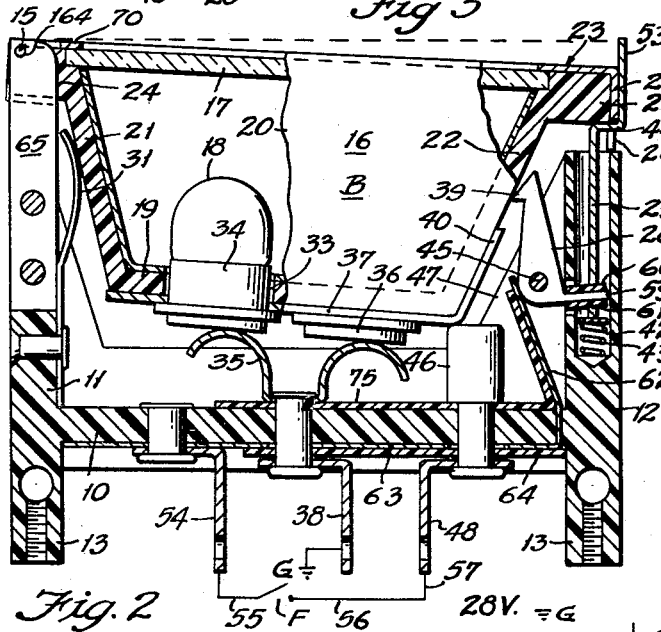
Fig. 2
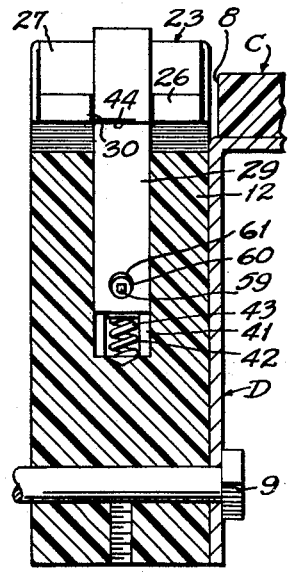
Fig. 4
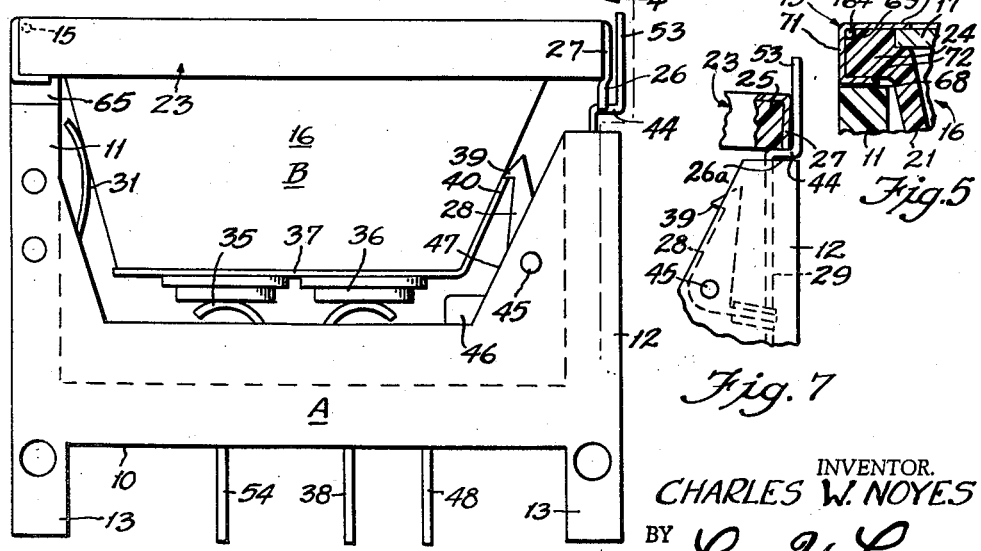
Fig. 1 · Fig. 5 · Fig. 7
INVENTOR.
CHARLES W. NOYES
BY Lynn H. Latta
—ATTORNEY—

United States Patent Office 2,925,592
Patented Feb. 16, 1960

2,925,592

MULTIPLE UNIT INDICATOR WITH INDIVIDUAL TESTING SYSTEM

Charles W. Noyes, Orange, Calif., assignor to Marco Industries Company, Anaheim, Calif., a corporation of California Application December 9, 1958, Serial No. 779,137

14 Claims. (Cl. 340—366)

This application is in part a continuation of my earlier applications S.N. 623,834, filed November 23, 1956, for Multiple Unit Indicator With Individual Testing System; S.N. 544,299, filed November 1, 1955, for Multiple Unit Annunciator With Press-to-Test Feature, and S.N. 714,931, filed February 12, 1958, for Multiple Unit Indicator With Individual Testing System.

This invention relates to indicator lights, and has as its general object to provide an improved indicator light unit of a type which may be embodied in association with other like units in a multiple unit annunciator apparatus wherein the several units may bear respective indicator legends that are rendered visible when illuminated. Such an indicator unit desirably embodies a narrow elongated light casing having a translucent indicator face bearing a selected legend, and the invention contemplates an arrangement wherein the light casing is hinged to a mounting bracket or frame at one end, is normally latched thereto at its other end, and is provided with means yieldingly biasing it to its normal latched position from which it can be (1) depressed to a testing position for closing a test circuit for testing the operating condition of its illuminating means, and (2) released for outward swinging movement away from the mounting bracket or casing to provide for access to the back of the light casing to replace burned-out light bulbs or to otherwise service the unit.

A specific object of the invention is to provide an improved latching mechanism in an indicator unit such as outlined above.

Another object is to provide an indicator light unit such as outlined above, wherein the light casing may be released to a position wherein the circuit to its illuminating lamps is opened, with the light casing remaining latched to the mounting casing and restrained from movement to the servicing position.

A further object is to provide such an indicator light unit embodying means operative to break a normal operating circuit when the light casing is depressed to the testing position. Its normal operating circuit may be one including a fault switch associated with a respective unit of mechanism to be maintained under observation, such as a landing gear or other operating unit of an airplane, the annunciator unit becoming illuminated when such fault switch is closed or, alternatively, when the light casing is depressed to the testing position.

A specific object is to provide such an indicator light unit wherein the breaking of the operating circuit will take place prior to the making of the test circuit when the light casing is depressed to the testing position.

A further object is to provide such an indicator light unit having an improved construction and arrangement such as (a) to assure the breaking of the normal operating circuit in advance of the making of the test circuit and (b) of durable and serviceable construction, adapted to withstand careless handling of the unit in servicing operations wherein the light casing is released to an inverted position.

Other objects and advantages will become apparent in the ensuing specifications and appended drawing in which:

Fig. 1 is a plan view of an indicator unit embodying the invention;

Fig. 2 is a view of the same with the light casing pressed down to the testing position, shown partially in plan and partially in section;

Fig. 3 is a face view of the same, partially in section;

Fig. 4 is a transverse sectional view of the same taken on the line 4—4 of Fig. 1;

Fig. 5 is a fragmentary sectional view of the same, taken on line 5—5 of Fig. 3;

Fig. 6 is a fragmentary view of the hinged side of the same; and

Fig. 7 is a fragmentary plan view, partially in section, illustrating a modified form of the invention.

*The invention as disclosed in Figs. 1–6*

Referring now to the drawings in detail, I have shown therein, as an example of one form in which the invention may be embodied, an indicator light embodying generally a mounting frame A and a light cartridge B mounted therein, the frame A being adapted to be mounted in a panel C (Fig. 4) by means of brackets D. Although a single one of the units can be mounted in isolated relation in a panel, the invention contemplates that normally a number of units will be mounted in a bank in a panel C. Brackets D are angle brackets, and are of less depth than the light unit, whereby the brackets may be attached to the rear or under face of panel D, with the forward portions of the units projecting through an opening 8 in the panel. Brackets D are attached only to the end units of the bank, the units being secured together in the bank by bolts 9 extending through them.

Frame A is of box form, including a core of insulating material, H-shaped as shown in Fig. 1, comprising a back web (bottom) 10 bridging between respective arms 11 and 12 projecting forwardly at respective sides thereof. Arms 11 and 12 and web 10 cooperate to define a narrow rectangular socket in which light cartridge B is normally received. In the rear of the frame A is a terminal-housing recess defined between projections 13.

Light cartridge B at one end is attached to arm 11 by a hinge 15. Cartridge B comprises a casing 16 of insulating material and a light-transmitting (e.g. translucent) window 17 bearing a legend which is preferably imprinted on the inner side of the window so as to be substantially invisible when the light bulbs 18, contained in the casing 16, are not lighted.

The casing 16 is of a relatively narrow, elongated rectangular shape as viewed from the front (Fig. 1). Its depth, front to rear, is sufficient to accommodate the height of light bulbs 18. Casing 16 has a back 19 in which the light bulbs 18 are mounted, and has sides 20, ends 21 and 22, and transverse end flanges 24, 25 which project over the arms 11, 12 of the mounting frame. Between end flanges 24 and 25 and the outer margins of sides 20 is defined a shallow recess in which window 17 is seated. Casing 16 is mounted in a rectangular cap 23, one end of which is attached to hinge 15. The end flange 24 is confined between one end of the cap and hinge 15, and end flange 25 is secured by spaced spring fingers 26 which snap over the end flange 25. Cap 23 is of stamped sheet metal, including an apertured front web and a marginal rim snugly receiving the casing 16 and latched thereto by spring fingers 26. Fingers 26 are formed as extensions of an end member 27 of cap 23. Cap 23 functions to secure the window 17 in its seating recess. Cartridge B is normally latched to arm 12 by a latch finger 28 which is actuated by a push bar 29 slidably mounted in arm 12. A notch 30 is defined between fingers 26.

A leaf spring 31, attached to the inner face of end member 11, bears yieldingly against the end 21 of casing 16, under sufficient deflection to maintain the casing normally in its latched position shown in Fig. 1.

Bulbs 18 have their base portions 34 mounted in sockets 33 in back 19. Sockets 33 are extended through a bus-bar 37 which extends lengthwise of back 19 and is mounted thereon. Base portions 34, constituting lateral contacts of bulbs 18, are in engagement with bus bar 37 for one side of their operating circuits. The end contacts 36 of light bulbs 18 are positioned to engage a pair of spring brush contacts 35 which as shown may be integrally attached together in the form of a U-yoke the web of which is mounted on panel 10. As the casing is pushed inwardly for testing, the brushes 35 yield by a flexing action while maintaining engagement with contacts 36. By means of a securing rivet, brushes 35 are connected through back 10 to a terminal 38.

Bus-bar 37 has an end portion which is bent around the corner of casing 16 on the end thereof near arm 12, to provide a combined latch keeper and breaker contact 40. Contact 40 is normally engaged yieldingly against a hook 39 on the end of latch 28 to maintain electrical contact in the normal position of the parts shown in Fig. 3.

Push-bar 29 is slidably mounted in a pair of grooves 41 communicating with diametrically opposite sides of a bore 42 in the arm 12 of frame A. A coil spring 43 is engaged between the bottom of bore 42 and the lower end of push bar 29, to maintain the latter in an outwardly projected normal position as shown in full lines in Fig. 1. Push bar 29 has an offset shoulder portion 44 which is received in the notch 30 defined between the pair of laterally spaced retainer fingers 26 of the light casing cap 23, the retainer fingers 26 being offset beneath the end flange 25 of the light casing 16, so as to be hooked against the under corner thereof for securing the cap to the casing 16. The clearance between end member 27 at the top of notch 30 and shoulder 44 is sufficient to accommodate the inward depression of the light casing unit B to establish contact between the bus bar 37 and a test contact 46.

Latch finger 28 is secured to (e.g. pressed onto) a fulcrum pin 45 the ends of which are pivoted in ears 47 which may be integral with frame arm 12, projecting inwardly therefrom.

Test contact 46 is attached to web 10 in a position beneath the movable end of cartridge B for engagement by the opposed end portion of a bus bar 37 when the cartridge is depressed as aforesaid. A rivet shank mounts it on back 10 and connects it to a terminal 48.

Fig. 2 illustrates schematically the electrical circuit in which my improved indicator may be utilized. A terminal 54 may be connected by a conductor 55 to a "fault" switch F embodied in mechanism (e.g. landing gear actuators) the condition of which is to be indicated. The other side of switch F, and terminal 48, may be connected by respective conductors 56, 57 to a source of electrical current indicated at 28V, in a circuit such as that described and illustrated in the application of George H. Rodgers, Serial Number 621,818, filed November 13, 1956.

The latch 28 has an integral tail lever 59 surrounded by an insulator collar 60 of nylon material which is received in a circular opening 61 in the latch actuating push bar 29. The breaker contact 40, formed integrally with the bus bar 37, functions both as a latch keeper (being of sufficient length to be engaged by the hook 39 of latch 28 in normal position of the light casing shown in Fig. 1) and also functions to establish a normal operating circuit from bus bar 37 through latch 28, thence through a leaf spring brush contact 62 which constantly bears with yielding pressure against the heel of latch 28, and thence to the terminal 54 which, as shown in Fig. 2, leads through conductor 55 to the fault switch F. Brush 62 is formed as an integral end portion of a strip of ribbon spring metal 63 which is clamped between terminal 54 and the frame web 10, the strip 63 having apertures through which the rivets of terminals 38 and 48 extend with sufficient clearance for insulating the strip 63 from those rivets. The constant yielding pressure of brush 62 against latch 28 eliminates any looseness between the latter and its pivot pin 45 and maintains a good electrical connection at all times. An insulator bar 64 is interposed between the heads of terminals 38 and 48 to insulate the latter from the connector strip 63. The constant pressure of loading spring 31 against the hinged end of light casing 16 maintains pressure engagement (and thus good electrical connection) between breaker contact 40 and the cooperating breaker contact latch 28.

The insulator sleeve 60 on the tail lever 59 of latch 28 insulates the latch 28 from push bar 29 while providing for the transmission of unlatching movement to the latch 28 when push bar 29 is shifted longitudinally in its guiding grooves 44. Such retraction of latch 28 is indicated in Fig. 2. The resultant release of light casing unit B allows the same to be flipped to its inverted position by the impelling action of loading spring 31, thus exposing the back of the light casing for servicing operations. The push bar 29 has an outer end part 53 extending alongside the end flange 25 of cap 23 and protecting the latter. By engaging the fingertip against the outer face of end part 29 and barely catching the fingernail over the end thereof, it is possible to depress the push bar 29 without interfering with the inverting movement of the light casing unit.

The indicator unit includes a further improvement, in the hinged connection between the light casing unit B and the frame A. The hinge pin 164 (Fig. 5) is mounted in the outer corner of a hinge blade 65 which is mounted in a slot 66 in the frame arm 11 and has an end portion projecting therebeyond and received in registering slots 67 (Fig. 6) and 68 (Fig. 5) in light casing body 16 and the end cap 23 respectively. The hinge pin 164 extends through and is fitted snugly in an aperture in the corner of blade 65 and has end portions projecting laterally on each side thereof and received in spaces defined between a transversely extending notch 69 (Fig. 5) extending transversely in the outer corner of end flange parts 24 of light casing 16 and the transverse corner defined between the windowed face plate portion 70 of casing cap 23 and the slotted end member (in the form of laterally spaced fingers) 71 thereof. Fingers 71 have hook portions 72 (Fig. 1) which engage beneath the end flange parts 24 to secure that end of the cap 23 to the casing body 16. The spring-loaded engagement of the other end flange 25 by spring retainer fingers 26 securely and snugly clamps the head of light casing 16 within the cap 23, which further includes side flanges 73 (Fig. 14) snugly embracing the sides of the casing head. With the cap 23 thus securely attached to the casing 16 with no end play between the two, the protecting end portions of hinge pin 164 will be snugly engaged between the corner of the cap 23 and the notch 69 of end flange parts 24 so that no end play between casing unit B and its mounted arm 11 of frame A can occur. This is important since any endwise play between the light casing and the frame would reduce or destroy the effectiveness of the latching connection between latch hook 39 and keeper-contact 40. Furthermore, the open notch 69 in flange parts 24 eliminates any thin web of the relatively fragile plastic material of flange 24 which would be interposed between the hinge pin and the end parts 71. In earlier devices, where the hinge pin extended through the plastic end flange 24, careless operators, having unlatched the casing unit B and inverted the same, in some cases carelessly forced the light casing beyond its normal inverted position, applying a very high leverage between the hinge pin and the surrounding plastic material of end flange parts 24, fracturing the outer corner portions thereof away from the body of the flange parts and thereby creating a looseness in the hinge which allowed the entire light casing unit B to yield endwise under the pressure of loading spring 31, shifting to a position where the latch 28 would not properly engage with its coacting keeper element on the adjacent end of casing body 16. The present invention has solved that problem, the springy yielding quality of cap 23 permitting the hinge to yield without breakage or deformation under pressure improperly applied to the inverted light casing.

In the assembly of the parts of light casing unit B, after the indicator window 17 has been dropped into its socket in the head of the casing body 16, the end flange parts 24 of the casing body 16 are inserted into the retaining spaces defined between hook parts 72 and facing web 70 of the cap 23 after the casing body 16 has been applied to the hinge pin 64 with the latter nesting in the notch 69. When the hinge end of the unit B is thus assembled, the opposite end of cap 23 is snapped over the end flange 25 of casing body 16, the retainer fingers 26 yielding outwardly and then snapping beneath the flange 25 to latch the cap to the body 16 with the window 17 secured between the two.

In the operation of the indicator unit, fingertip pressure applied to the latched end of casing unit B, pressing the same toward the frame arm 12, will cause this end of the casing unit to yield toward the testing position shown in Fig. 2. In the initial stage of this movement, the breaker contact 40 will separate from the hook 39 of latch 28, thus breaking the normal operating circuit to the fault switch F. Further movement of the casing unit B will establish engagement of the bus bar 37 against the test contact 46, thus closing the test circuit through terminal 48 and conductor 57, bypassing the fault switch F and lighting the lamps 18 if they are in proper operating condition. For servicing, the latch actuator bar 29 is pushed inwardly by fingernail pressure against its end part 53, sliding the bar 29 in its guide grooves 41 and tilting latch 28 away from keeper-contact 40 to release the cartridge B for movement to its inverted servicing position.

To prevent any possibility of brush 62 contacting the test contact 49, a strip 75 of insulating material is interposed between these parts. Strip 75 may be anchored between the contact 46 and frame web 10.

*The invention as disclosed in Fig. 7*

Fig. 7 illustrates a slight modification of the indicator unit differing therefrom in that the notch defined between retainer fingers 26a is shallower, and fingers 26a are shortened so that the flange 27 may be effective to transmit to the offset shoulder 44 of push bar 29, movement for retracting the latch 28 as the light casing unit B is depressed to the testing position. This provides for breaking the normal operating circuit by the retractive swinging of the latch 28, resulting in wider separation between the latch hook 39 and the keeper-contact 40, and effecting separation of these breaker contacts at an earlier stage in the depression of the light casing unit B. Thus the opening of the normal operating circuit prior to closing the test circuit is doubly assured.

I claim:

1. In an indicator unit for a multiple unit annunciator apparatus: a mounting frame; an elongated indicator casing having at its front an indicator face and having a lamp-mounting back; a hinge at one end of said casing, connecting said casing to one side of said frame; a latch pivotally mounted on the other side of said frame; a keeper-contact carried by said casing and engageable by said latch for holding said casing in a normal indicating position wherein said casing back is adjacent said frame; spring means acting between said frame and casing to yieldingly maintain said casing in said normal indicating position with said keeper-contact engaging said latch; an electric light bulb within said casing, having a base mounted in said back and having a pair of terminal contacts; a yielding terminal carried by said frame and normally engaging one of said terminal contacts to establish a normal operating circuit; a pair of test contacts mounted in opposed, normally disengaged relation upon said frame and said casing adjacent said back, for establishing a test circuit to said lamp when engaged; a second terminal carried by said frame; means providing a constant conducting connection between said second terminal and said latch; means providing a common conducting connection between the other of said bulb contacts and said casing-mounted test contact and said keeper-contact; and means for actuating said latch to a release position for releasing said casing for swinging movement about said hinge to a position in which said casing back is exposed for servicing operations; said casing being adapted to response to pressure applied to its latched end to move toward said frame to disengage said keeper contact from said latch so as to open said normal operating circuit and to engage said test contact so as to establish said test circuit.

2. An indicator unit as defined in claim 1, wherein said frame includes a central web portion, generally parallel to said casing back in the normal operating position of the casing and a pair of side arms projecting from respective sides of said web portion to points adjacent the forward corners of said casing; and wherein said latch actuating means comprises a push-bar slidably mounted in the arm at said other side of the frame and a spring acting between said frame and said push-bar to urge the same outwardly to a retracted position; and wherein said latch includes a pivot providing said pivotal attachment, an arm projecting from said pivot toward the front of said casing between said last mentioned frame arm and the adjacent end of the casing and terminating in a hook for engagement with said keeper-contact and a tail lever projecting from said pivot generally transversely to said latch arm and having an operating connection with said push-bar, whereby when said push-bar is thrust inwardly said latch hook will be swung away from said casing toward the adjacent frame arm to said release position, the inward depression of said casing to engage said test contacts resulting in the movement of said keeper-contact away from said latch hook in a direction generally parallel to said latch arm, for opening said normal operating circuit.

3. An indicator unit as defined in claim 2, wherein said push bar has a circular opening registering with said tail lever, and including a sleeve of wear-resistant material encircling said tail lever and engaged in said opening to provide said operative connection.

4. An indicator unit as defined in claim 3, wherein said arm at the other side of the frame has therein a longitudinally extending slideway in which said push bar is slidably mounted, and wherein said spring consists in a coil spring engaged under compression between the inner end of said push bar and said frame.

5. An indicator unit as defined in claim 1, wherein said constant conducting connection comprises a leaf spring yieldingly bearing against said latch adjacent its pivot, and a conductor strip to which said leaf spring is joined, said strip being mounted against said lamp-mounting back and connected to said second terminal.

6. An indicator unit as defined in claim 1, wherein said frame includes a central web portion, generally parallel to said casing back in the normal operating position of the casing and a pair of side arms projecting from respective sides of said web portion to points adjacent the forward corners of said casing; and wherein said latch actuating means comprises a push-bar slidably mounted in the arm at said other side of the frame and a spring acting between said frame and said push-bar to urge the same outwardly to a retracted position;

and wherein said latch includes a pivot providing said pivotal attachment, an arm projecting from said pivot toward the front of said casing between said last mentioned frame arm and the adjacent end of the casing and terminating in a hook for engagement with said keeper-contact and a tail lever projecting from said pivot generally transversely to said latch arm and having an operating connection with said push-bar, whereby when said push-bar is thrust inwardly said latch hook will be swung away from said casing toward the adjacent frame arm to said release position; said push-bar having near its outer end an offset shoulder and said casing having at its adjacent end a projecting end part overhanging said shoulder and engageable therewith when said casing is depressed for engaging said test-contact, whereby to transmit to said push-bar, inward movement resulting in the swinging of said latch away from said keeper-contact whereby to further separate said latch hook from said keeper-contact.

7. In an indicator unit for a multiple unit annunciator apparatus: a mounting frame; an elongated indicator cartridge comprising a casing having an indicator face at its front and having a lamp-mounting back; a hinge at one end of said casing, connecting said casing to one side of said frame; a latch pivotally mounted on the other side of said frame; a keeper-contact carried by the other end of said casing and engageable by said latch for holding said casing in a normal indicating position wherein said casing back is adjacent said frame; spring means acting between said frame and casing to yieldingly maintain said casing in said normal indicating position with said keeper-contact engaging said latch; an electric light bulb within said casing, having a base mounted in said back and having a pair of terminal contacts; a yielding terminal carried by said frame and normally engaging one of said terminal contacts to establish a normal operating circuit; a pair of test contacts mounted in opposed, normally disengaged relation upon said frame and said casing adjacent said back, for establishing a test circuit to said lamp when engaged; a second terminal carried by said frame; means providing a constant conducting connection between said second terminal and said latch; means providing a common conducting conection between the other of said bulb contacts and said casing-mounted test contact and said keeper-contact; means for actuating said latch to a release position in which said casing back is exposed for servicing operations; said casing being adapted in response to pressure applied to its latched end to move toward said frame to disengage said keeper contact from said latch so as to open said normal operating circuit and to engage said test contact so as to establish said test circuit; said latch actuating means comprising a push-bar slidably mounted in said other side of the frame and a spring acting between said frame and said push-bar to urge the same outwardly to a retracted position; said latch including a pivot providing said pivotal attachment, an arm projecting from said pivot generally parallel to and adjacent said other end of the casing and terminating in a hook for engagement with said keeper-contact, and a tail lever projecting from said pivot toward the front of said casing generally transverse to said latch arm and having an operating connection with said push-bar, whereby when said push-bar is thrust inwardly said latch hook will be swung away from said casing toward the adjacent frame arm, the inward depression of said casing to engage said test contacts resulting in the movement of said keeper-contact away from said latch hook in a direction generally parallel to said latch arm, for opening said normal operating circuit.

8. An indicator unit as defined in claim 7, wherein said push-bar has near its outer end an offset shoulder and said casing has at its adjacent end a projecting flange part overhanging said shoulder and engageable therewith when said casing is depressed for engaging said test-contact, whereby to transmit to said push-bar, inward movement resulting in the swinging of said latch away from said keeper-contact whereby to open said normal operating circuit.

9. An indicator unit as defined in claim 7, wherein said cartridge further includes a cap having at one end a pair of fingers projecting toward said frame, and wherein said push bar includes near its outer end an offset shoulder straddled by said fingers.

10. In an indicator unit for a multiple unit annunciator apparatus: a mounting frame; an indicator casing having at its front a relatively narrow elongated indicator face and having a lamp-mounting back; a hinge at one end of said casing near the plane of said indicator face, connecting said casing to one side of said frame; a latch pivotally mounted on the other side of said frame; a keeper-contact carried by said casing and engageable by said latch for holding said casing in a normal indicating position wherein said casing back is in adjacent relation to said frame; an electric light bulb within said casing, having a base mounted in said back and having a pair of terminal contacts, said casing having a depth between said back and indicator face such as to contain said bulb; a yielding terminal carried by said frame and normally engaging one of said terminal contacts to establish a normal operating circuit; a pair of test contacts mounted in opposed, normally disengaged relation upon said frame and said casing adjacent said back, for establishing a test circuit to said lamp when engaged; a second terminal carried by said frame; means constantly providing a conducting connection between said second terminal and said latch; means providing a conducting connection between the other of said terminal contacts and said casing-mounted test contact and said keeper-contact; and means for actuating said latch to a release position for releasing said casing for swinging movement about said hinge to a position in which said casing back is exposed for servicing operations; said casing being adapted in response to pressure applied to its latched end to swing about said hinge toward said frame to disengage said keeper contact from said latch so as to open said normal operating circuit and to engage said test contacts for establishing said test circuit.

11. In an indicator unit for a multiple unit annunciator apparatus: a mounting frame; an indicator casing having a relatively narrow elongated indicator face at its front and having a back in spaced generally parallel relation to said indicator face and normally in spaced adjacent relation to said frame, said casing having at one end, near the plane of said indicator face, a hinge connecting it to one side of said frame; means operative to latch the other end of said casing to the other side of said frame, said means being releasable to allow the casing to be swung to inverted position with relation to said frame; an electric light bulb within said casing, having a base mounted in said back and having a pair of terminal contacts, said casing being of substantial depth between said indicator face and back to accommodate the height of said light bulb therebetween; a yielding terminal carried by said frame, normally in conducting engagement with one of said terminal contacts for establishing a normal operating circuit; a breaker contact carried by said casing and electrically connected to the other of said terminal contacts; a coacting breaker contact carried by said frame and normally in engagement with said first mentioned breaker contact; a movable test contact carried by said casing near its said other end; and a second test contact carried by said frame in normally opposed, spaced relation to said movable test contact, for engagement thereby upon depression of said other end of the casing, for establishing a test circuit to said bulb, said breaker contacts being arranged for separation upon engagement of said test contact, whereby to break said normal operating circuit; said frame including a central web portion generally parallel to said casing back in the normal operating position of the casing, and a pair of side arms projecting from respective sides of said web portion to points adjacent the forward corners of said casing; said latching means comprising a push-bar slidably mounted in the arm at said other side of the frame and a spring acting between said frame and said push-bar to urge the same outwardly to a retracted position, a latch pivoted to said frame, an arm projecting from the pivot of said latch between said last mentioned frame arm and the adjacent end of the casing and terminating in a hook for engagement with said casing and a portion projecting from said pivot toward the front of said casing generally transverse to said latch arm and having an operating connection with said push-bar, whereby when said push-bar is thrust inwardly said latch hook will be swung outwardly away from said casing toward the adjacent frame arm to release said casing, said push-bar having near its outer end an offset shoulder and said casing having at its adjacent end a projecting flange part overhanging said shoulder and engageable therewith when said casing is depressed for engaging said test-contacts, whereby to transmit to said push-bar, inward movement resulting in the outward swinging of said latch.

12. An indicator device comprising: a mounting frame of U-section including a pair of side arms and a back member extending between and joining said side arms; a narrow deep, elongated lamp casing having a narrow elongated light-transmitting front and a lamp-mounting back, normally received within said frame; an indicator window lens in said front; a cap of sheet material attached to said front and retaining said window; a hinge joining one end of said casing, near said front, to one of said side arms; spring means engaged between said one side arm and said one end of the casing and yieldingly loading said casing for outward swinging movement of the other end thereof away from said bracket around the axis of said hinge; latch means operating between the other of said side members and said other end of the casing to normally retain said casing in an operative position; a lamp socket in said casing back; an electric lamp having a central contact and a base constituting a lateral contact mounted in said socket; a yielding contact mounted on said back member and yieldingly engaging said central contact between said back member and casing back; a fixed contact carried by said other side arm, adjacent said latch means; a movable contact carried by said casing at said other end thereof, connected to said lamp base and normally engaged with said fixed contact; and a test contact carried by said back member rearwardly of said other end of the casing in a position opposed to said movable contact, said casing being arranged so that its said other end can be depressed away from said latch toward said frame, whereby to first break contact between said movable contact and said fixed contact and then establish contact with said test contact; and said latch means being operable to release said other end of the casing for swinging movement through an arc of approximately 180 degrees, whereby to expose the rear end of said lamp for removal through said casing back from the rear side thereof, and to expose the interior of said bracket for servicing operations; said hinge comprising a hinge bar mounted in a slot in one of said side arms, in the major plane of said indicator unit and having an end part projecting beyond said one arm, a hinge pin secured in an outer corner of said hinge bar adjacent the plane of said indicator face and having laterally projecting end portions, a bifurcated flange on one end of said lamp casing, defining a slot receiving said projecting end part of the hinge bar, the furcations of said flange having in their outer corners, open notches receiving said projecting end portions of the hinge pins, said cap embodying a windowed face plate retaining said window lens and end flanges in embracing engagement with the ends of said casing front, one of said flanges and the adjoining part of said face plate and cooperating with said notches to confine said projecting end parts of the hinge pin to complete the hinge.

13. In an indicator unit for a multiple unit annunciator apparatus: a mounting frame having a bottom and forwardly projecting arms at respective sides thereof; an elongated indicator casing hinged at one end to one of said arms, having a back in opposed adjacent relation to said bottom and an indicator face opposite said back; an electric light bulb within said casing, having a base mounted in said back and having a pair of terminal contacts; a yielding terminal carried by said frame, normally in conducting engagement with one of said contacts; a breaker contact carried by said casing and electrically connected to the other of said terminal contacts; a resilient contact brush mounted on said frame and normally in contact with said breaker contact; a movable test contact carried by said casing and connected to said other terminal contact; a test contact carried by said frame in opposed normally spaced relation to said movable test contact, for engagement thereby upon depression of the other end of the casing, for establishing a test circuit to said bulb; means carried by said casing for engaging said contact brush and springing it out of contact with said breaker contact so as to break the connection between said brsuh and said light bulb when said casing is depressed for engaging said test contacts; and means operative to latch said other end of said casing to said frame, said latching means comprising a flat push bar, the other arm having therein a bore at right angles to the plane of said indicator face and registering with said other end of the casing and having a pair of slideways communicating with the respective sides of said bore, said bar being slidably mounted in said bore and slideways, a latch pivoted to said frame adjacent the inner face of said other flange on an axis parallel to the axis of said hinge, said latch including a finger extending generally parallel to said other arm and having at its forward end a latch hook inter-engageable with said other end of the casing for holding the casing in its normal position and having at its other end a laterally extending tail lever, said push bar having an aperture receiving said tail lever to provide an operating connection such as to release said hook from said casing upon depression of said push bar, and a coil spring under compression between the rear end of said push bar and the bottom of said bore, for yieldingly biasing said push bar in the direction for maintaining said hook engaged with said casing.

14. An indicator unit as defined in claim 13, including a sleeve of wear resistant plastic material surrounding said tail lever and engaged in said push bar aperture.

No references cited.